(12) United States Patent
Ohnuma et al.

(10) Patent No.: US 8,683,528 B2
(45) Date of Patent: Mar. 25, 2014

(54) INFORMATION PROCESSING APPARATUS AND METHOD, RECORDING MEDIUM, AND PROGRAM

(75) Inventors: Kensuke Ohnuma, Tokyo (JP); Hitoshi Kimura, Kanagawa (JP); Shinichi Wakai, Tokyo (JP); Keiichi Yoshioka, Tokyo (JP); Shingo Utsuki, Kanagawa (JP); Hidetoshi Ichioka, Tokyo (JP)

(73) Assignee: Sony Corporation (JP)

( * ) Notice: Subject to any disclaimer, the term of this patent is extended or adjusted under 35 U.S.C. 154(b) by 1111 days.

(21) Appl. No.: 10/522,444

(22) PCT Filed: Jul. 23, 2003

(86) PCT No.: PCT/JP03/09304
§ 371 (c)(1),
(2), (4) Date: Aug. 19, 2005

(87) PCT Pub. No.: WO2004/010690
PCT Pub. Date: Jan. 29, 2004

(65) Prior Publication Data
US 2006/0072354 A1 Apr. 6, 2006

(30) Foreign Application Priority Data
Jul. 23, 2002 (JP) ................................ P2002-213822

(51) Int. Cl.
*G06F 3/00* (2006.01)
*G06F 13/00* (2006.01)
*H04N 5/445* (2011.01)

(52) U.S. Cl.
USPC ............ 725/58; 725/38; 725/45; 725/53

(58) Field of Classification Search
USPC .................... 725/55, 58, 38, 45, 53
See application file for complete search history.

(56) References Cited

U.S. PATENT DOCUMENTS 4,847,696 A * 7/1989 Matsumoto et al. .......... 386/291
5,353,121 A * 10/1994 Young et al. .................. 725/52

(Continued)

FOREIGN PATENT DOCUMENTS

EP 0924927 6/1999
JP 07-121935 A 5/1995

(Continued)

OTHER PUBLICATIONS

Supplementary European Search Report, EP 03765352, dated Mar. 30, 2009.

*Primary Examiner* — Nnenna Ekpo
(74) *Attorney, Agent, or Firm* — Lerner, David, Littenberg, Krumholz & Mentlik, LLP

(57) ABSTRACT

Information processing methods to make it possible to reserve recording of a program without imposing a large burden on a user. A server transmits program attribute information to a video recording and reproducing apparatus via a network. The program attribute information includes program attribute names and program attribute retrieval conditions. The video recording and reproducing apparatus causes a display apparatus to display a list of the program attribute names. The user selects from the list a program attribute name to which a program that the user wishes to reserve for recording seems to be most closely related. The video recording and reproducing apparatus compares the retrieval conditions corresponding to the selected program attribute name and EPG (electronic program guide) information and, when the retrieval conditions are satisfied, records a program represented by the EPG in a recording reservation list. The methods can be applied to a hard disk video recorder.

16 Claims, 13 Drawing Sheets

(56) References Cited

U.S. PATENT DOCUMENTS

| | | | | |
|---|---|---|---|---|
| 5,798,785 A | * | 8/1998 | Hendricks et al. | 725/46 |
| 5,805,763 A | * | 9/1998 | Lawler et al. | 386/296 |
| 6,400,406 B1 | * | 6/2002 | Kim | 348/460 |
| 6,415,099 B1 | * | 7/2002 | Berger | 386/291 |
| 6,636,688 B1 | * | 10/2003 | Otana | 386/239 |
| 6,754,436 B1 | * | 6/2004 | Shinagawa et al. | 386/291 |
| 7,062,150 B1 | * | 6/2006 | Wugofski | 386/291 |
| 7,475,417 B2 | * | 1/2009 | Marsh | 725/58 |
| 7,773,860 B2 | * | 8/2010 | Wood et al. | 386/296 |
| 8,181,214 B2 | * | 5/2012 | Nashida et al. | 725/115 |
| 8,281,345 B2 | * | 10/2012 | Baumgartner et al. | 725/78 |
| 8,336,071 B2 | * | 12/2012 | Ward et al. | 725/42 |
| 8,380,049 B2 | * | 2/2013 | Lang et al. | 386/291 |
| 8,424,038 B2 | * | 4/2013 | Thomas et al. | 725/44 |
| 8,447,170 B2 | * | 5/2013 | Casagrande | 386/296 |
| 8,448,215 B2 | * | 5/2013 | Hassell et al. | 725/133 |
| 8,453,174 B2 | * | 5/2013 | Schein et al. | 725/36 |
| 8,453,193 B2 | * | 5/2013 | Barton et al. | 725/133 |
| 8,457,475 B2 | * | 6/2013 | Ellis et al. | 386/291 |
| 8,464,296 B2 | * | 6/2013 | Knudson et al. | 725/58 |
| 2002/0019979 A1 | * | 2/2002 | Koreeda et al. | 725/39 |
| 2002/0124256 A1 | * | 9/2002 | Suzuka | 725/55 |

FOREIGN PATENT DOCUMENTS

| | | |
|---|---|---|
| JP | 11-008810 | 1/1999 |
| JP | 11-164217 | 6/1999 |
| JP | 2000-155764 | 6/2000 |
| JP | 2000-295554 | 10/2000 |
| JP | 2001-028717 | 1/2001 |
| JP | 2001-148812 | 5/2001 |
| JP | 2001-326925 | 11/2001 |
| JP | 2002-084469 | 3/2002 |
| WO | WO-00/02386 | 1/2000 |
| WO | 01/11865 | 2/2001 |
| WO | 01/22729 | 3/2001 |

* cited by examiner

*FIG. 11*

| BROADCAST PROGRAM INFORMATION ||
|---|---|
| BROADCASTING STATION | TV JAPAN |
| BROADCAST DATE | 2002/3/26 |
| START TIME | 17:00 |
| END TIME | 18:00 |
| GENRE | VAUDEVILLE |
| TITLE | NEWS 17 |
| DETAILED INFORMATION | PRIME MINISTER RESIGNED YEN INCREASING IN VALUE |
| ⋮ | ⋮ |
| ⋮ | ⋮ |

FIG. 12

| RECORDING RESERVATION LIST | | | | |
|---|---|---|---|---|
| NUMBER | BROADCAST DATE | BROADCASTING STATION | BROADCAST START TIME | BROADCAST END TIME |
| 1 | JULY 1, 2002 | TV JAPAN | 16:00:00 | 16:30:00 |
| 2 | JULY 1, 2002 | NHH | 17:30:00 | 18:30:00 |
| 3 | JULY 1, 2002 | ABC | 19:20:00 | 19:40:00 |
| 4 | JULY 1, 2002 | BBB | 21:00:00 | 21:10:00 |
| 5 | JULY 2, 2002 | TVV | 13:00:00 | 15:00:00 |
| 6 | JULY 2, 2002 | TVV | 15:00:00 | 16:30:00 |
| 7 | | | | |
| 8 | | | | |
| 9 | | | | |
| 10 | | | | |

INFORMATION PROCESSING APPARATUS AND METHOD, RECORDING MEDIUM, AND PROGRAM

BACKGROUND OF THE INVENTION

1. Field of the Invention

The present invention relates to an information processing apparatus and method, a recording medium, and a program, and in particular, to an information processing apparatus and method, a recording medium, and a program that allows a user to reserve a program easily.

2. Background Art

PCT Application WO00/02386 discloses a technique for recording a televised program and classifying the recorded program based on a performer of the program or a keyword.

In addition, Japanese Applications JP-A-7-12193 or JP-A-2000-295554 discloses a technique in which a user designates information such as a genre, a performer, a time frame of a program, and in which the user reserves to record, in detail and reserves to record the program on the basis of the designated conditions.

However, the invention disclosed in PCT Application WO00/02386 simply classifies a recorded program and does not allow a user to reserve to record a program easily.

On the other hand, the invention disclosed in Japanese Applications JP-A-7-12193 and JP-A-2000-295554 makes it possible to automatically reserve to record a program.

However, in such an invention, a user has to designate parameters such as a genre, a performer, and a time frame which imposes a large burden on the user. Thus, the user cannot easily and promptly reserve to record a program.

SUMMARY OF THE INVENTION

The invention addresses the above situation and allows a user to reserve to record a program easily and surely without imposing an excessive burden on the user.

A first information processing apparatus of the present invention comprises: presenting means for presenting a plurality of program attribute names comprising program attribute information concerning attributes of a program; accepting means for accepting a selection of the program attribute information by a user based on the presented program attribute names; storing means for storing the accepted selection of program attribute information; first acquiring means for acquiring broadcast program information concerning a program to be broadcast; second acquiring means for acquiring retrieval conditions for retrieving a program comprising the stored program attribute information; comparing means for comparing the acquired broadcast program information and the acquired retrieval conditions; and reserving means for reserving recording of a program that corresponds to the acquired broadcast program information, when the acquired broadcast program information satisfies the acquired retrieval conditions.

The program attribute names can include at least one of foreign film, soap opera, rebroadcast drama, baseball, soccer, midnight vaudeville, melodramatic Japanese popular song, classical music, news, cooking, hot spring, or go/shogi.

The retrieval conditions can include at least one of a genre of a program, a day of week on which the program is broadcast, a time frame in which the program is broadcast, a length of the program, a keyword included in a title of the program or in detailed information introducing contents of the program, or an escape keyword that is excluded from the title of the program or from the detailed information introducing contents of the program.

The first information processing apparatus further comprises: receiving means for receiving the program attribute information including the program attribute names and the retrieval conditions from another information processing apparatus via a network, wherein the presenting means presents the program attribute names included in the program attribute information received by the receiving means.

A first information processing method of the present invention comprises: presenting a plurality of program attribute names comprising program attribute information concerning attributes of a program; accepting a selection of the program attribute information by a user based on the presented program attribute names; storing the accepted selection of program attribute information; acquiring broadcast program information concerning a program to be broadcast; acquiring retrieval conditions for retrieving a program comprising the stored program attribute information; comparing the acquired broadcast program information and the acquired retrieval conditions; and reserving recording of a program that corresponds to the acquired broadcast program information when the acquired broadcast program information satisfies the acquired retrieval conditions.

A first recording medium of the present invention recorded with a computer readable program for making a computer execute a method of processing information, the method comprising: presenting a plurality of program attribute names comprising program attribute information concerning attributes of a program; accepting a selection of the program attribute information by a user based on the presented program attribute names; storing the accepted selection of program attribute information; acquiring broadcast program information concerning a program to be broadcast; acquiring retrieval conditions for retrieving a program comprising the stored program attribute information; comparing the acquired broadcast program information and the acquired retrieval conditions; and reserving recording of a program that corresponds to the acquired broadcast program information when the acquired broadcast program information satisfies the acquired retrieval conditions.

A first system of the present invention for processing information, the system comprising: a processor operable to execute instructions; and instructions for causing the processor to execute an information processing method, the method comprising: presenting a plurality of program attribute names comprising program attribute information concerning attributes of a program; accepting a selection of the program attribute information by a user based on the presented program attribute names; storing the accepted selection of program attribute information; acquiring broadcast program information concerning a program to be broadcast; acquiring retrieval conditions for retrieving a program comprising the stored program attribute information; comparing the acquired broadcast program information and the acquired retrieval conditions; and reserving recording of a program that corresponds to the acquired broadcast program information when the acquired broadcast program information satisfies the acquired retrieval conditions.

A second information processing apparatus of the present invention, comprising: accepting means for accepting an access request from another information processing apparatus via a network; receiving means for receiving from the another information processing apparatus a transfer request for transfer of program attribute information concerning attributes of a program to be reserved for recording, the program attribute information being used when a user of the another information processing apparatus selects the program to be reserved for recording; and transmitting means for transmitting the program attribute information to the another information processing apparatus via the network, the program attribute information including program attribute names and retrieval conditions for retrieving a program.

A second information processing method of the present invention, comprising: accepting an access request from another information processing apparatus via a network; receiving from the another information processing apparatus a transfer request for transfer of program attribute information concerning attributes of a program to be reserved for recording, the program attribute information being used when a user of the another information processing apparatus selects the program to be reserved for recording; and transmitting the program attribute information to the another information processing apparatus via the network, the program attribute information including program attribute names and retrieval conditions for retrieving a program.

A second recording medium of the present invention recorded with a computer readable program for making a computer execute a method of processing information, the method comprising: accepting an access request from another information processing apparatus via a network; receiving from the another information processing apparatus a transfer request for transfer of program attribute information concerning attributes of a program to be reserved for recording, the program attribute information being used when a user of the another information processing apparatus selects the program to be reserved for recording; and transmitting the program attribute information to the another information processing apparatus via the network, the program attribute information including program attribute names and retrieval conditions for retrieving a program.

A second system of the present invention for processing information, the system comprising: a processor operable to execute instructions; and instructions for causing the processor to execute an information processing method, the method including: accepting an access request from another information processing apparatus via a network; receiving from the another information processing apparatus a transfer request for transfer of program attribute information concerning attributes of a program to be reserved for recording, the program attribute information being used when a user of the another information processing apparatus selects the program to be reserved for recording; and transmitting the program attribute information to the another information processing apparatus via the network, the program attribute information including program attribute names and retrieval conditions for retrieving a program.

An information processing apparatus of the present invention, comprising: presenting mechanism operable to present a plurality of program attribute names comprising program attribute information concerning attributes of a program; accepting mechanism operable to accept a selection of the program attribute information by a user based on the presented program attribute names; storing mechanism operable to store the accepted selection of program attribute information; first acquiring mechanism operable to acquire broadcast program information concerning a program to be broadcast; second acquiring mechanism operable to acquire retrieval conditions for retrieving a program comprising the stored program attribute information; comparing mechanism operable to compare the acquired broadcast program information and the acquired retrieval conditions; and reserving mechanism operable to reserve recording of a program that corresponds to the acquired broadcast program information, when the acquired broadcast program information satisfies the acquired retrieval conditions.

An information processing apparatus of the present invention, comprising: accepting mechanism operable to accept an access request from another information processing apparatus via a network; receiving mechanism operable to receive from the another information processing apparatus a transfer request for transfer of program attribute information concerning attributes of a program to be reserved for recording, the program attribute information being used when a user of the another information processing apparatus selects the program to be reserved for recording; and transmitting mechanism operable to transmit the program attribute information to the another information processing apparatus via the network, the program attribute information including program attribute names and retrieval conditions for retrieving a program.

In a first invention, plural program attribute names are presented, and selection of the presented program attribute names by a user is accepted. Retrieval conditions corresponding to program attribute information for which the selection is accepted and broadcast program information are compared, and recording of a program corresponding to the broadcast program information is reserved on the basis of a result of the comparison.

In a second invention, program attribute information including program attribute names and retrieval conditions is transmitted to another information processing apparatus via a network.

BRIEF DESCRIPTION OF THE DRAWINGS

FIG. 11 is a diagram showing an example of broadcast program information.

FIG. 12 is a diagram showing an example of a recording reservation list.

DETAILED DESCRIPTION

Figure 1:
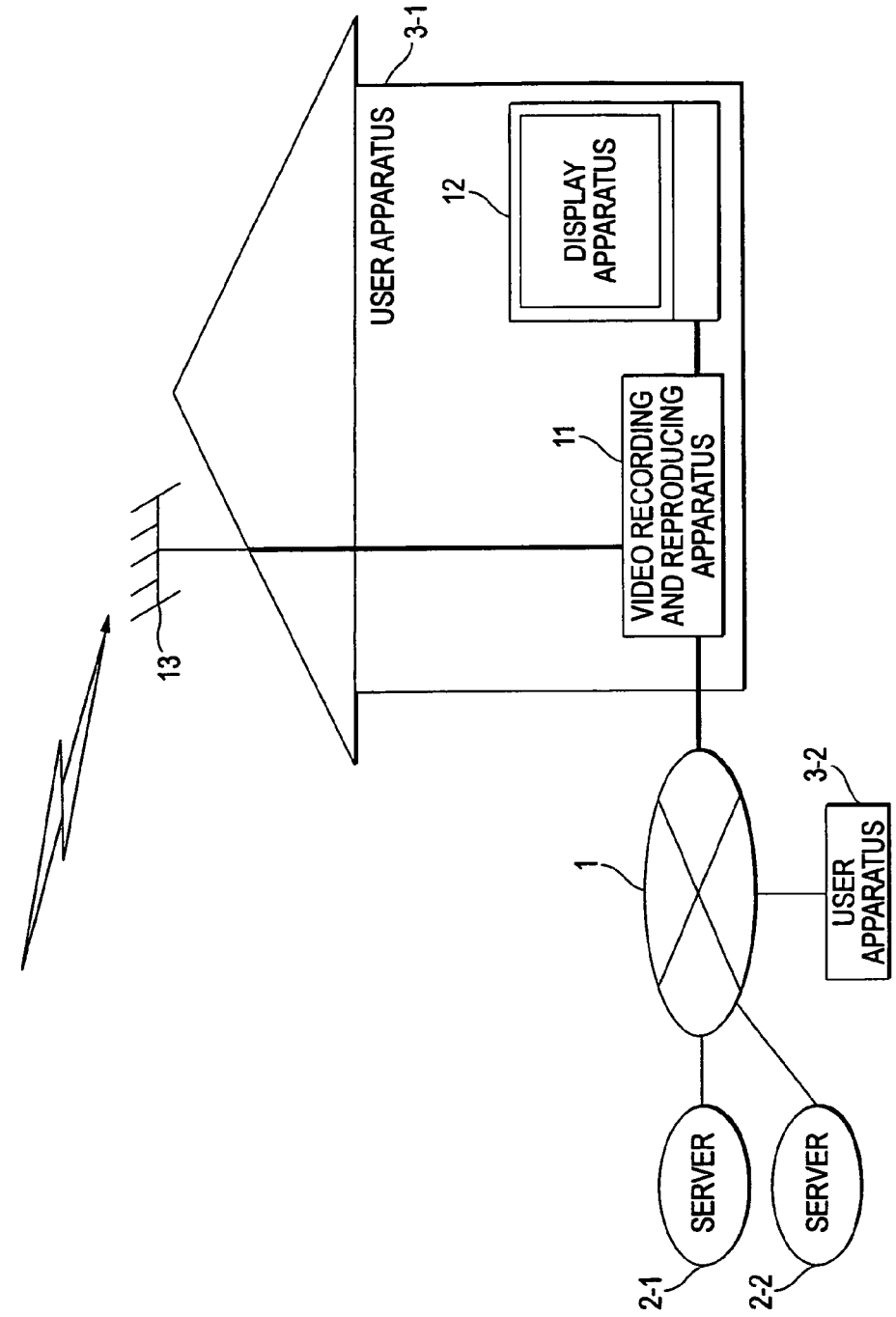
FIG. 1 is a diagram showing an example of a structure of a network system in accordance with an embodiment of the present application.

FIG. 1 shows an example of a structure of a network system in accordance with an embodiment of the present application.

In this example, servers 2-1 and 2-2 and user apparatus 3-1 and 3-2 are connected to a network 1 such as the Internet, a WAN (Wide Area Network), a LAN (Local Area Network), or the like. In the example in FIG. 1, the two servers 2-1 and 2-2 (these servers will be hereinafter referred to simply as server when it is not necessary to distinguish the servers individually) and the two user apparatus 3-1 and 3-2 (these user apparatus will be hereinafter referred to simply as user apparatus 3 when it is not necessary to distinguish the user apparatus individually) are connected to the network 1. However, the numbers of the servers and user apparatus are arbitrary and may be three or more, respectively.

The servers 2-1 and 2-2 provide program attribute information (program attribute information 431 in FIG. 9 to be described later) and broadcast program information (EPG (Electric Program Guide) information) to the user apparatus 3 via the network 1, respectively.

The user apparatus 3 is arranged in a user's home, and the user apparatus includes a video recording and reproducing apparatus 11, a display apparatus 12, and an antenna 13.

The video recording and reproducing apparatus 11 can be, for example, a hard disk video recorder. The video recording and reproducing apparatus 11 receives a broadcast wave via the antenna 13 and causes an auxiliary storage 40 (see FIG. 2 to be described later), which is incorporated in the video recording and reproducing apparatus 11, to store a signal obtained by demodulating the broadcast wave. The video recording and reproducing apparatus 11 also provides the signal to the display apparatus 12 and causes the display apparatus 12 to display a video. The display apparatus 12 can be, for example, a television receiver or a monitor.

Although not shown in the figure, the user apparatus 3-2 is similar to the user apparatus 3-1.

Figure 2:
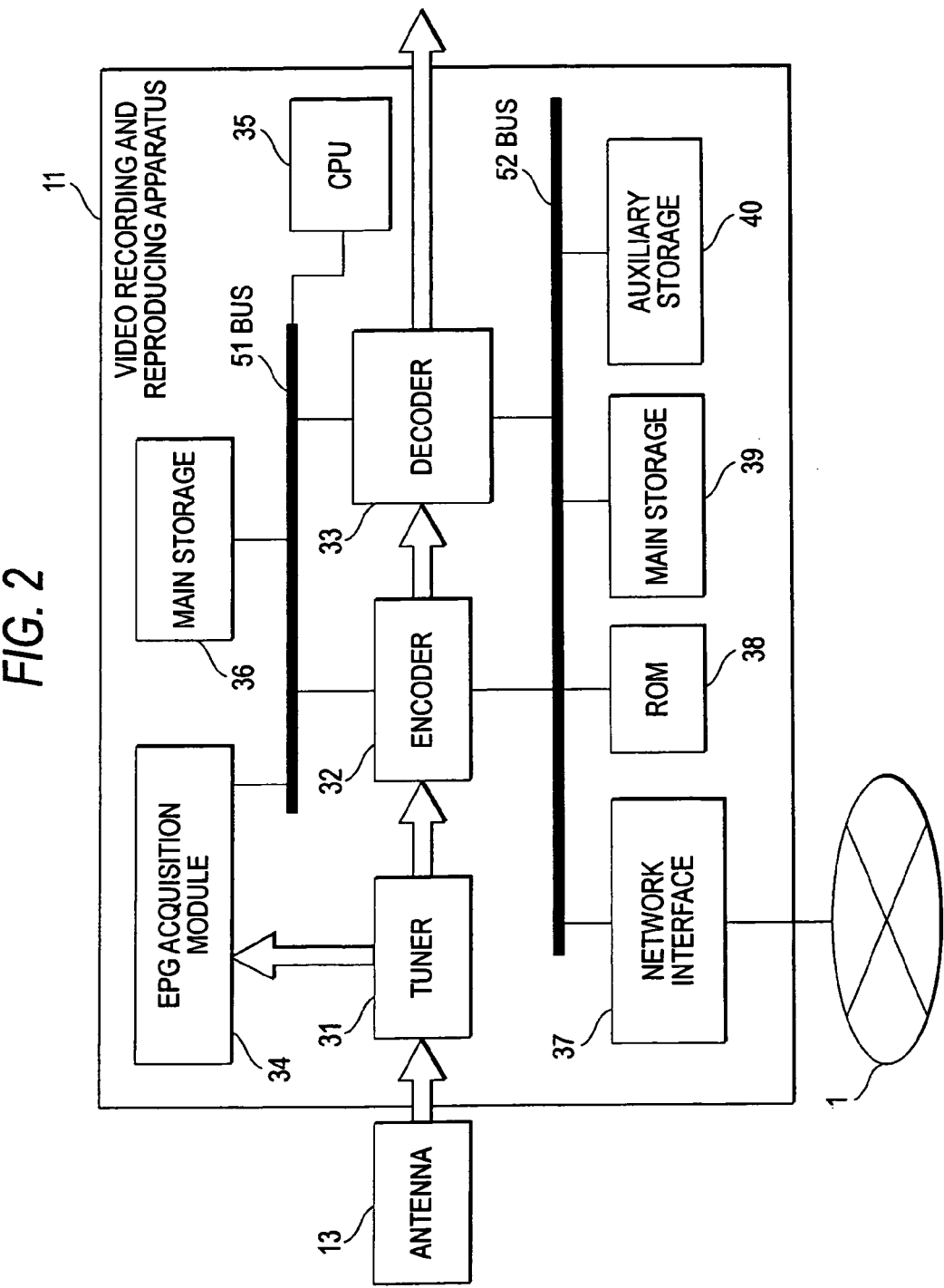
FIG. 2 is a block diagram showing an example of a structure of a video recording and reproducing apparatus in FIG. 1.

FIG. 2 shows an embodiment of the video recording and reproducing apparatus 11. A tuner 31 demodulates a broadcast signal corresponding to a broadcast wave of a ground wave television broadcast received by the antenna 13 and outputs a video signal component and a sound signal component to an encoder 32. EPG information is included in a vertical blanking period of a ground wave television broadcast received by the antenna 13, and the tuner 31 outputs the EPG information to an EPG acquisition module 34.

The encoder 32 encodes a video signal and a sound signal input from the tuner 31 in, for example, a MPEG (Moving Picture Experts Group) system, supplies the video signal and the sound signal to the auxiliary storage 40 via a bus 52, and causes the auxiliary storage 40 to store the video signal and the sound signal. The auxiliary storage 40 can be a hard disk, a magnetic tape, a removable disk, a flash memory, or the like.

The video signal and the sound signal stored in the auxiliary storage 40 are output to a decoder 33 via the bus 52, decoded in the MPEG system and, then, supplied to the display apparatus 12. When the received video signal and sound signal are not stored in the auxiliary storage 40, the encoder 32 and the decoder 33 output a signal output from the tuner 31 to the display apparatus 12 directly.

A main storage 39 comprising, for example, a RAM (Random Access Memory) and a ROM (Read Only Memory) 38 are connected to the bus 52. Data and parameters, which are required when a CPU (Central Processing Unit) 35 executes various kinds of processing, are stored in the main storage 39 as required. A program to be executed by the CPU 35 is stored in the ROM 38.

A network interface 37, which executes interface processing with the network 1, is further connected to the bus 52.

The CPU 35 is connected to a bus 51 together with the encoder 32, the decoder 33, and the EPG acquisition module 34. In addition, a main storage 36 such as a RAM or the like is connected to the bus 51.

Figure 3:
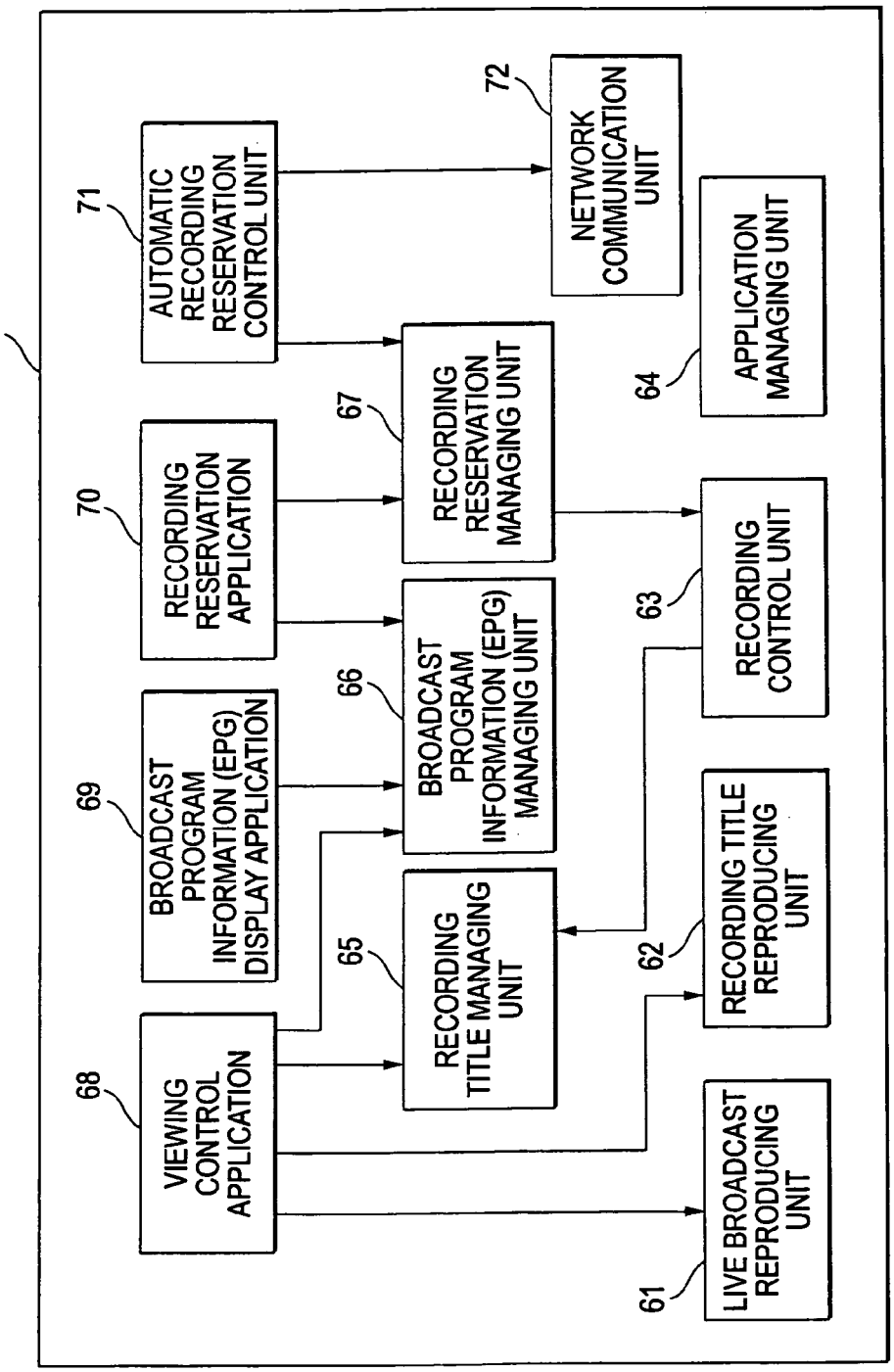
FIG. 3 is a diagram showing a functional structure of the video recording and reproducing apparatus in FIG. 1.

A functional structure comprising software of the video recording and reproducing apparatus 11 is shown in FIG. 3. A live broadcast reproducing unit 61 executes processing for a signal being received by the tuner 31 or a signal input from an external input terminal (not shown). A recording title reproducing unit 62 executes reproduction processing for a program (title) stored in the auxiliary storage 40. A recording control unit 63 executes signal recording processing for the auxiliary storage 40. An application managing unit 64 executes monitoring processing for startup, end, and operation states of a viewing control application 68, a broadcast program information display application 69, and a recording reservation application 70.

The viewing control application 68 controls the live broadcast reproducing unit 61, the recording title reproducing unit 62, the recording title managing unit 65, or the broadcast program information managing unit 66 based on an instruction from a user to reproduce a signal being received or input or performs reproduction of a program stored in the auxiliary storage 40. In addition, when the viewing control application 68 controls the live broadcast reproducing unit 61 to cause the tuner 31 to receive a broadcast program of a channel designated by the user, the viewing control application 68 refers to broadcast program information stored in the broadcast program information managing unit 66 according to a particular application. Moreover, when the viewing control application 68 controls the recording title reproducing unit 62 to reproduce a program stored in the auxiliary storage 40, the viewing control application 68 refers to management information of a program stored in the recording title managing unit 65 according to a particular application.

The broadcast program information display application 69 refers to the broadcast program information (EPG information) stored in the broadcast program information managing unit 66 and causes the display apparatus 12 to display the broadcast program information. The recording reservation application 70 executes recording reservation processing based on an instruction from the user. At this point, the recording reservation application 70 refers to the broadcast program information stored in the broadcast program information managing unit 66 as required. In addition, when the recording reservation application 70 performs recording reservation based on the operation from the user, the recording reservation application 70 controls the recording reservation managing unit 67 to execute recording reservation processing.

The recording title managing unit 65 manages information on a program (title) stored in the auxiliary storage 40. The broadcast program information managing unit 66 manages broadcast program information acquired by the EPG acquisition module 34. The recording reservation managing unit 67 controls the recording control unit 63 based on a request from the recording reservation application 70 or an automatic recording reservation control unit 71 to execute recording reservation processing.

The automatic recording reservation control unit 71 executes recording reservation processing based on program attribute information acquired from the server 2-1. A network communication unit 72 communicates with the servers 2-1 and 2-2 via the network 1 and acquires program attribute information and broadcast program information.

Figure 4:
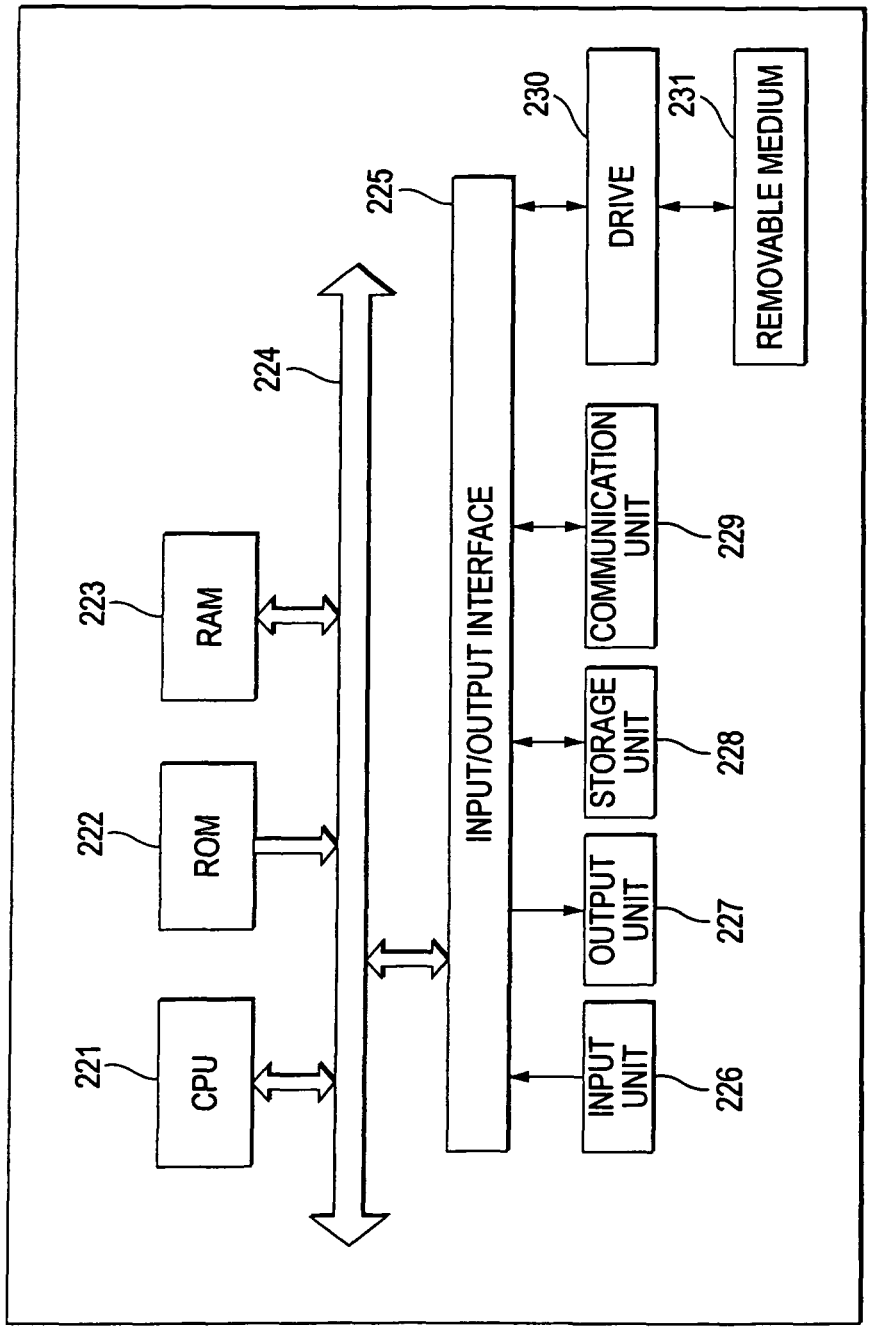
FIG. 4 is a block diagram showing an example of a structure of a server in FIG. 1.

FIG. 4 shows an embodiment of the server 2-1. In FIG. 4, a CPU (Central Processing Unit) 221 executes various kinds of processing in accordance with a program stored in a ROM (Read Only Memory) 222 or a program loaded to a RAM (Random Access Memory) 223 from a storage unit 228. Data and the like, which are necessary when the CPU 221 executes various kinds of processing, are also stored in the RAM 223 according to a particular application.

The CPU 221, the ROM 222, the RAM 223 are connected to one another via a bus 224. An input/output interface 225 is also connected to the bus 224.

An input unit 226 can include a keyboard, a mouse, or the like, a display such as a CRT (Cathode Ray Tube), an LCD (Liquid Crystal Display), or the like, an output unit 227 can include a speaker or the like, a storage unit 228 can include a hard disk or the like, and a communication unit 229 can include a modem or the like are connected to the input/output interface 225. Program attribute information to be provided to the user apparatus 3 is stored in the storage unit 228. The communication unit 229 performs communication processing via the network 1 such as the Internet.

A drive 230 is also connected to the input/output interface 225 as required, and a removable medium 231 such as a magnetic disk, an optical disk, a magneto-optical disk, or a semiconductor memory is mounted on the input/output interface 225 according to a particular application. A computer program read out from the removable disk is installed in the storage unit 228 as required.

Although not shown in the figure, the server 2-2 has basically the same structure as the server 2-1 shown in FIG. 4.

Figure 5:
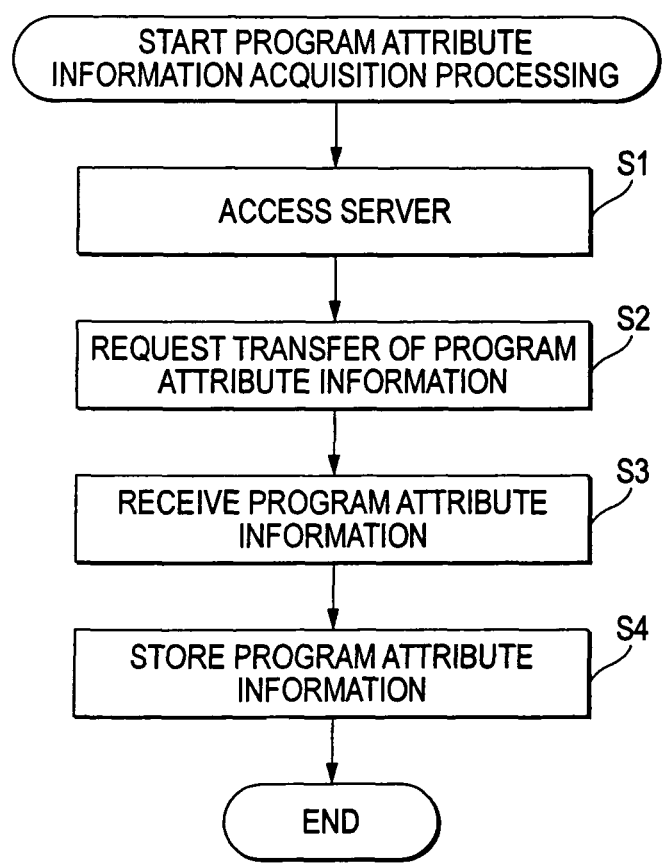
FIG. 5 is a flowchart of program attribute information acquisition processing of the video recording and reproducing apparatus in FIG. 1.

Next, with reference to FIG. 5, a description will be provided of processing in which the user apparatus 3 acquires program attribute information from the server 2-1.

In step S1, the automatic recording reservation control unit 71 controls the network communication unit 72 to access the server 2-1 via the network 1. In step S2, the automatic recording reservation control unit 71 controls the network communication unit 72 to request the server 2-1 to transfer program attribute information.

As described later with reference to FIG. 6, the server 2-1 having received this request transmits the program attribute information via the network 1 (step S23 in FIG. 6). Thus, in step S3, the automatic recording reservation control unit 71 receives the program attribute information, which is transmitted from the server 2-1 via the network 1, via the network communication unit 72. In step S4, the automatic recording reservation control unit 71 causes the auxiliary storage 40 (or the main storage 39) to store the program attribute information received from the server 2-1.

Figure 6:
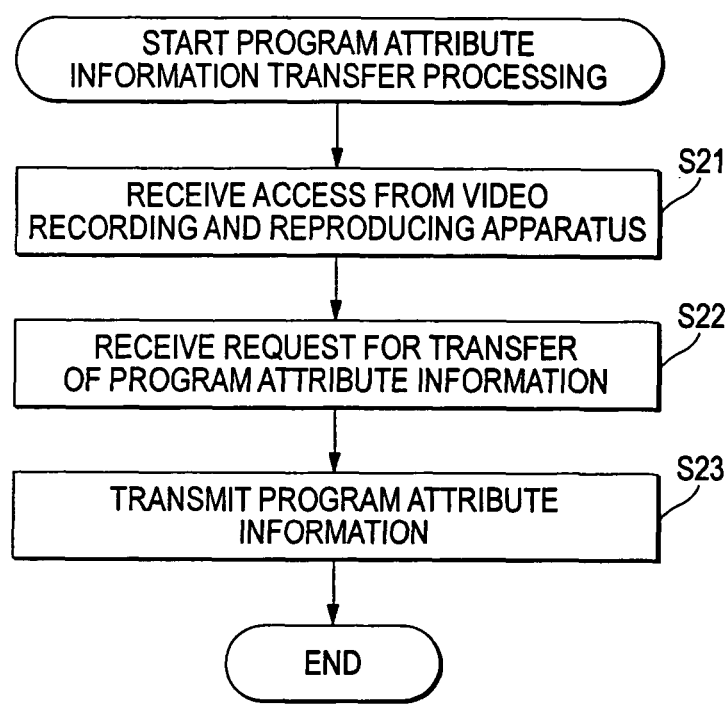
FIG. 6 is a flowchart of program attribute information transfer processing of the server in FIG. 1.

In association with the program attribute information acquisition processing of the video recording and reproducing apparatus 11 as described above, the server 2-1 executes processing indicated in the flowchart in FIG. 6.

In step S21, the CPU 221 accepts an access request from the video recording and reproducing apparatus 11 via the network 1. In step S22, the CPU 221 accepts the request for transfer of program attribute information in which the video recording and reproducing apparatus 11 transmitted in step S2. In step S23, the CPU 221 reads out the program attribute information stored in the storage unit 228 and controls the communication unit 229 to transmit the program attribute information to the video recording and reproducing apparatus 11 via the network 1.

As described above, the video recording and reproducing apparatus 11 of the user apparatus 3 acquires the program attribute information from the server 2-1 in advance and causes the auxiliary storage 40 to store the program attribute information.

When the auxiliary storage 40 includes, for example, a removable disk or a flash memory, the user is provided with the medium, in which program attribute information is recorded, from an administrator of the server 2-1, whereby it is possible to cause the auxiliary storage 40 to hold the information.

Therefore, it is possible to rewrite (update) program attribute information to new information as required. As a result, for example, it is possible to provide each user with program attribute information matching a period when a program is broadcast such as a feature program on an election or a feature program on the Olympics. By providing such program attribute information, the administrator of the server 2-1 can apply a charging processing to the user who is provided with the information and make a profit.

Figure 7:
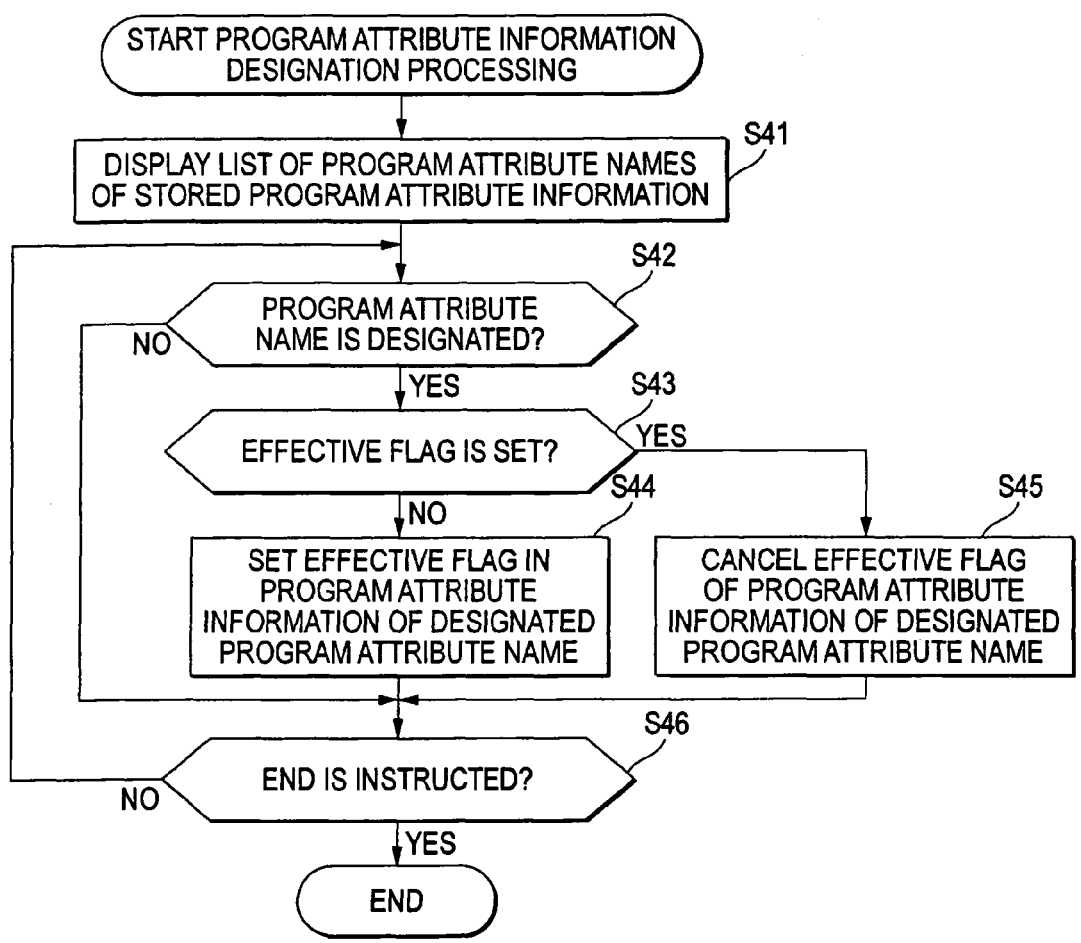
FIG. 7 is a flowchart of program attribute information designation processing of the video recording and reproducing apparatus in FIG. 1.

As described above, it is possible for the user, who has acquired the program attribute information, to easily reserve a desired program for recording. In performing the recording reservation, the user performs an operation designating the program attribute information. Next, processing in this case will be explained with reference to a flowchart in FIG. 7. This processing is started when the user instructs start of program attribute information designation processing.

In step S41, the automatic recording reservation control unit 71 reads out program attribute names of the program attribute information, which is stored in the auxiliary storage 40 by processing in step S4, and causes the display apparatus to display a list of the program attribute names. Consequently, for example, an image shown in FIG. 8 is displayed on the display apparatus 12.

Figure 8:
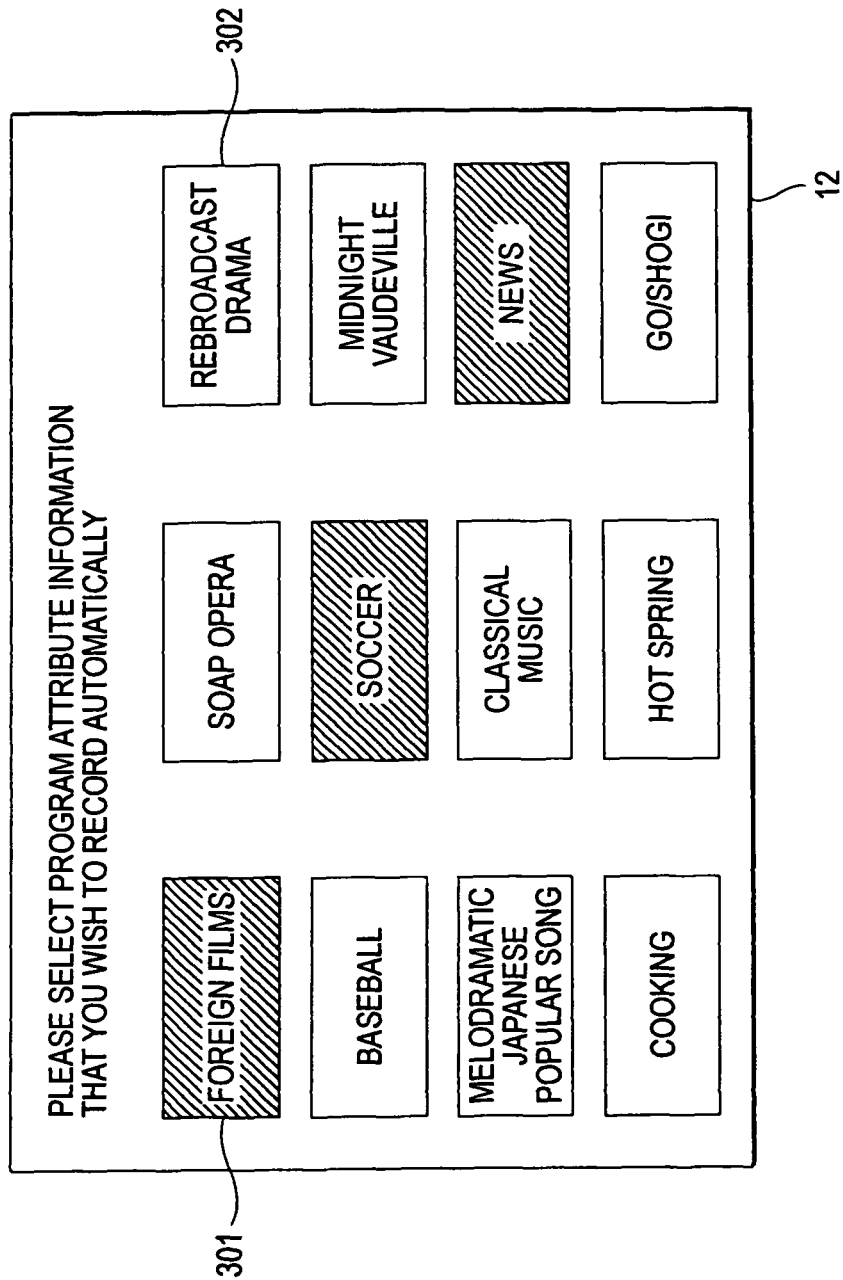
FIG. 8 is a diagram showing an example of display of a list of program attribute names in FIG. 7.

In an example in FIG. 8, a message "please select program attribute information that you wish to record automatically" and program attribute names "foreign film", "soap opera", "rebroadcast drama", "baseball", "soccer", "midnight vaudeville", "melodramatic Japanese popular song", "classical music", "news", "cooking", "hot spring", and "go/shogi" are displayed. It should be noted that program attribute names are not limited to these examples. The user designates a program attribute name, to which a program that the user wishes to reserve to record seems to correspond, out of the program attribute names displayed in this way. For example, the user designates the program attribute name "foreign film" when the user wishes to reserve to record a program of a foreign film. The user designates the program attribute name "soccer" when the user wishes to reserve to record a program of soccer. The user designates the program attribute name "news" when the user wishes to reserve to record a program of news.

In the example of display in FIG. 8, program attribute names designated by the user are displayed as shaded program attribute names 301, and program attribute names not designated by the user are displayed as unshaded program attribute names 302.

Figure 9:
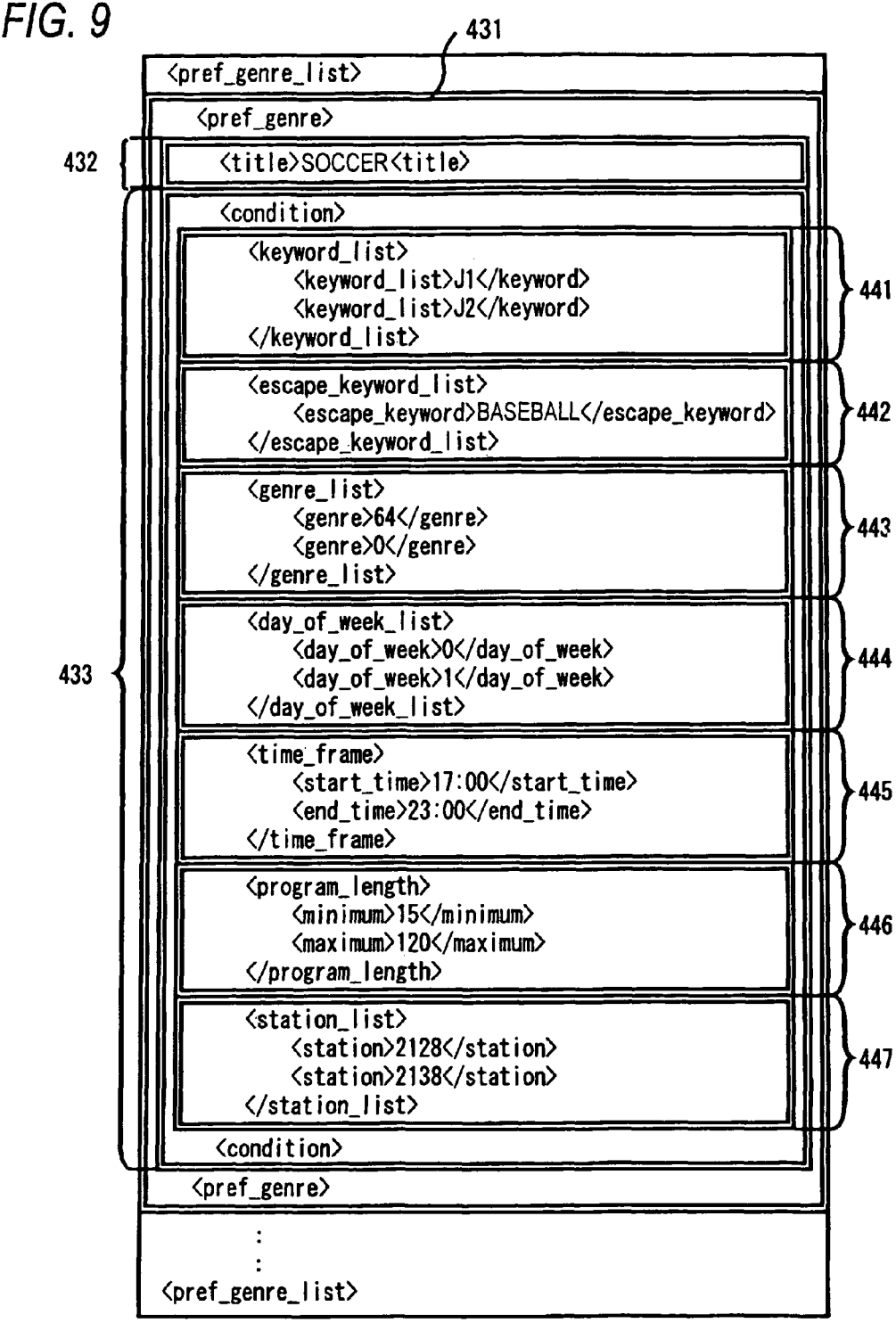
FIG. 9 is a diagram showing an example of program attribute information.

FIG. 9 shows an example of a structure of program attribute information. As shown in FIG. 9, program attribute information 431 includes a program attribute name 432 and program attribute retrieval conditions 433. In an example in FIG. 9, the program attribute name 432 is set as "soccer". Further, the program attribute retrieval conditions 433 include respective parameters of a keyword 441, an escape keyword 442, a genre 443, a day of week 444, a time frame 445, a program length 446, and a broadcasting station 447. It should be noted that program attribute retrieval conditions are not limited to these examples.

The keyword 441 is a keyword for, when the keyword is included in a title of a program included in EPG (broadcast program information) or detailed information introducing contents of the program, extracting the program as a program that is reserved to be recorded. In this example in FIG. 9, "J1" and "J2" are set as keywords. Therefore, in the case of this example, when characters of "J1" or "J2" are included in a title or detailed information of a program, the program is retrieved as a recording reservation program.

The escape keyword 442 is a keyword for, when the keyword is included in a title or detailed information of a program of EPG, excluding the program from a program that is reserved to be recorded. In the case of this example, "baseball" is set as an escape keyword. In the case of this example, since the program attribute name 432 is "soccer", when the word "baseball" is included in a title or detailed information of a program, the program is excluded from recording reservation objects.

The genre 443 designates a genre of a program that is reserved to be recorded. In the case of this example, programs of genres with IDs "64" and "0" are set as reservation objects. The ID of "64" is a genre of, for example, soccer, and the genre of "0" is a genre of sports.

The day of week 444 designates a day of week on which a program set as a recording reservation object is broadcast. In the case of this example, a day of week with an ID "0" and a day of week with an ID "1" are designated. The day of week with the ID "0" is, for example, Sunday, and the day of week with the ID "1" is, for example, Monday.

The time frame 445 defines a time frame of a program set as a recording reservation object. In the case of this example, programs, which are broadcast between 17:00 and 23:00, are programs set as reservation objects.

The program length 446 defines a length of a program set as a reservation object. In the case of this example, programs with lengths of 15 minutes or more and 120 minutes or less are set as reservation objects.

The broadcasting station 447 designates a broadcasting station that broadcasts a program set as a reservation object. In the case of this example, a broadcasting station with an ID "2128" and a broadcasting station with an ID "2138" are designated.

The keyword 441, the escape keyword 442, the genre 443, the day of week 444, the time frame 445, the program length 446, and the broadcasting station 447 comprising the program attribute retrieval conditions 443 described above are not designated by each user but are set by the server 2-1 in advance in association with the program attribute name 432 of "soccer". In other words, when a user designates the program attribute name "soccer" in FIG. 8, this means that the user designates the retrieval conditions in FIG. 9 associated with the program attribute name. Since retrieval conditions are not designated by the user but are designated by the server 2-1, the user only has to performonly operation for selecting the program attribute name "soccer". Therefore, it is possible to set parameters for recording reservation in an easy, sure, and prompt manner.

Referring back to FIG. 7, in step S42, the automatic recording reservation control unit 71 determines whether one of the program attribute names, which are displayed as shown in FIG. 8 by processing in step S41, is designated by the user. When one program attribute name is designated, the processing proceeds to step S43 and the automatic recording reservation control unit 71 determines whether an effective flag is set in association with the selected program attribute name. The effective flag indicates that program attribute information is program attribute information for which the user designated recording reservation.

If it is determined in step S43 that an effective flag is not set, then processing proceeds to step S44 and the automatic recording reservation control unit 71 sets an effective flag in program attribute information of the program attribute name for which designation is accepted by processing in step S42.

More specifically, in the state shown in FIG. 8, for example, when the program attribute name "baseball" is designated by the user, an effective flag is set in program attribute information corresponding to this program attribute name "baseball", and the program attribute name "baseball" is displayed as the shaded program attribute name 301.

On the other hand, if it is determined in step S43 that an effective flag is already set, the processing proceeds to step S45 and the automatic recording reservation control unit 71 cancels the effective flag of program attribute information of the designated program attribute name. More specifically, for example, in the example of display in FIG. 8, when the program attribute name "soccer" is designated, since this program attribute name is in a state in which an effective flag is already set, the setting of the effective flag is cancelled when this program attribute name is designated again, and the program attribute name "soccer" is displayed as the unshaded program attribute name 302.

If it is determined in step S42 that a program attribute name is not designated, or after the effective flag setting processing in step S44 or the effective flag cancellation processing in step S45 is executed, in step S46, the automatic recording reservation control unit 71 determines whether end of the program attribute information designation processing is instructed by the user. If the end is not instructed, then processing returns to step S42 and the automatic recording reservation control unit 71 executes the processing in step S42 and subsequent steps repeatedly. If it is determined in step S46 that the end of the program attribute information designation processing is instructed, the automatic recording reservation control unit 71 ends the processing.

As described above, simply by selecting predetermined program attribute names in an arbitrary number out of the program attribute names provided from the server 2-1, the user can set program attribute retrieval conditions associated with the program attribute names. Then, when this setting (selection) is performed, recording reservation is automatically performed as explained below.

Figure 10:
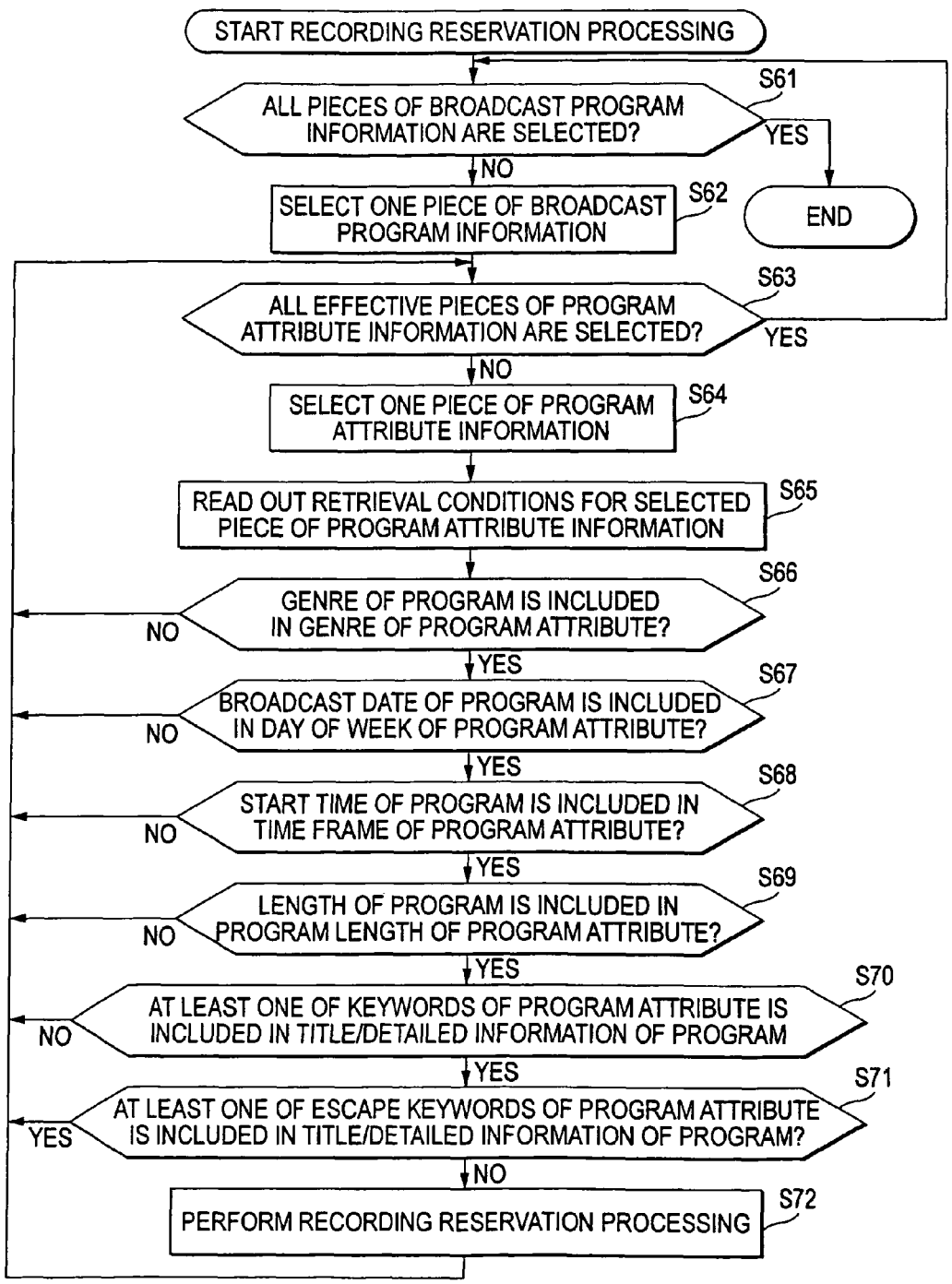
FIG. 10 is a flowchart explaining recording reservation processing of the video recording and reproducing apparatus in FIG. 1.

Next, recording reservation processing, which is automatically executed by the automatic recording reservation control unit 71 after the user performs the designation processing for a program attribute name (program attribute information), will be explained with reference to a flowchart in FIG. 10. Note that processing shown in this flowchart in FIG. 10 is executed periodically at a predetermined time period set in advance.

In step S61, the automatic recording reservation control unit 71 determines whether all pieces of broadcast program information (EPG information) are selected. As described above, the EPG information is acquired by the EPG acquisition module 34 and managed by the broadcast program information managing unit 66. More specifically, the EPG information is stored in the auxiliary storage 40.

FIG. 11 shows an example of such EPG information (broadcast program information). Note that the example in FIG. 11 represents broadcast program information of one program, and broadcast program information of immediately following programs, for example, programs to be broadcast in two days is stored in the auxiliary storage 40.

In the example in FIG. 11, it is assumed that a broadcasting station that broadcasts the program is TV Japan and a broadcast date of the program is Mar. 26, 2002. In addition, it is assumed that broadcast start time of this program is 17:00 and end time is 18:00. Further, it is assumed that a genre of this program is vaudeville and a title of the program is "news 17". Moreover, information "prime minister resigned, yen increasing in value . . . " is described as detailed information.

When it is determined in step S61 that all pieces of broadcast program information are not selected yet, then processing proceeds to step S62 and the automatic recording reservation control unit 71 selects one piece of broadcast program information from out of the stored broadcast program information for, for example, two days. For example, broadcast program information of one program as shown in FIG. 11 is selected here.

Next, in step S63, the automatic recording reservation control unit 71 determines whether all effective pieces of program attribute information are selected. Here, effective program selection information means the program attribute information for which the effective flag is set by the processing in step S44 in FIG. 7 (the program attribute information for which program attribute names are displayed with a shade in the example of display in FIG. 8). In the example of display in FIG. 8, the effective program attribute information includes three pieces of program attribute information "foreign film", "soccer", and "news". In step S63, it is determined whether all the three pieces of effective program attribute information are selected. If program attribute information not selected yet is still present, then processing proceeds to step S64 and the automatic recording reservation control unit 71 selects one piece out of the program attribute information not selected yet. For example, the program attribute information "soccer" is selected out of the three pieces of effective program attribute information shown in FIG. 8.

At this point, processing proceeds to step S65 and the automatic recording reservation control unit 71 reads out retrieval conditions for the program attribute information selected by processing in step S64. For example, when program attribute information corresponding to the program attribute name "soccer" is selected by the processing in step S64, then program attribute retrieval conditions 433 shown in FIG. 9 are read out here.

Then, in the following steps S66 to S71, judgment processing on whether the broadcast program information (EPG information) selected by processing in step S62 is included in the retrieval conditions read out by processing in step S65 is performed.

More specifically, in step S66, it is determined whether a genre of the broadcast program information selected by the processing in step S62 (the genre in FIG. 11) is included in a genre of the retrieval conditions read out by the processing in step S65 (the genre 443 in FIG. 9).

In step S67, it is determined whether a broadcast date of the broadcast program information selected by the processing in step S62 (the broadcast date in FIG. 11) is included in a day of week of the retrieval conditions readout by the processing in step S65 (whether the broadcast date in FIG. 11 is a day of week defined in the day of week 444 in FIG. 9).

Moreover, in step S68, it is determined whether a start time of a program of the broadcast program information (the start time in FIG. 11) is included in a time frame of the retrieval conditions (the time frame 445 in FIG. 9).

In step S69, it is determined whether a length of a program of the broadcast program information (a time calculated as a difference between the end time and the start time in FIG. 11) is included in a program length of the retrieval conditions (the program length 446 in FIG. 9).

In step S70, it is determined whether a keyword of the retrieval conditions (the keyword 441 in FIG. 9) is included in a title and detailed information included in the broadcast program information (the title and the detailed information in FIG. 11).

Moreover, in step S71, it is determined whether at least one escape keyword of the retrieval conditions (the escape keyword 442 in FIG. 9) is included in a title and detailed information of the broadcast program information (the title and the detailed information in FIG. 11).

When it is determined in all of the processing in steps S66 to S70 that the object items are included in the retrieval conditions and it is determined in step S71 that an escape keyword is not included in the title and the detailed information of the program, then processing proceeds to step S72 and the automatic recording reservation control unit 71 controls the recording reservation managing unit 67 to add the program currently set as a processing object to a recording reservation list.

The escape keyword in step S71 is a keyword for excluding a program from a retrieval object when the keyword is included in the program. Thus, a program satisfies the retrieval conditions when the program does not include the escape keyword. Therefore, only when all the items satisfy the retrieval conditions according to the processing from step S66 to step S71, the recording reservation processing in step S72 is performed.

In other words, when it is determined that the retrieval conditions are not satisfied in at least one kind of the judgment processing from step S66 to step S71, the recording reservation processing in step S72 is not executed, and the processing returns to step S63.

When it is judged in step S72 that the recording reservation processing is completed, the processing also returns to step S63.

In step S63, it is determined again whether all the effective pieces of program attribute information are selected. If all the effective pieces of program attribute information are not selected yet, in the example in FIG. 8, next, for example, the program attribute information "foreign film" is selected by the processing in step S64 and the processing from step S65 to step S72 is executed as in the case described above.

When the processing described above is repeated and if it is determined in step S63 that all the effective pieces of program attribute information are selected (if it is judged that all the three pieces of program attribute information "soccer", "foreign film", and "news" in FIG. 8 are selected), then processing returns to step S61. In step S61, the automatic recording reservation control unit 71 determines whether all the pieces of broadcast program information are selected. If it is judged that all the pieces of broadcast program information are not selected yet (if a program not selected yet is present), then processing proceeds to step S62, broadcast program information of the program is selected and the processing in step S63 and subsequent steps is executed as in the case described above.

When the processing described above is repeated and if it is determined in step S61 that all the pieces of broadcast program information are selected (if it is determined that broadcast program information for programs for two days is selected), then processing is ended.

As described above, the automatic recording reservation control unit 71 causes the recording reservation managing unit 67 to create a recording reservation list shown in FIG. 12.

In an example in FIG. 12, a broadcast date, a broadcasting station, a broadcast start time, and a broadcast end time of a program to be reserved for recording are registered. For example, a program to be broadcast from 16:00:00 to 16:30:00 in a broadcasting station TV Japan on Jul. 1, 2002 is registered as a program reserved for recording.

This recording reservation list is created automatically when a user simply performs operation for selecting program attribute names "foreign film", "soccer", and "news". Therefore, the user is not forced to bear an excessive burden in creating this recording reservation list.

It should be mentioned that it is also possible that the user designates predetermined programs individually via the recording reservation application 70 to register the programs in the recording reservation list.

Figure 13:
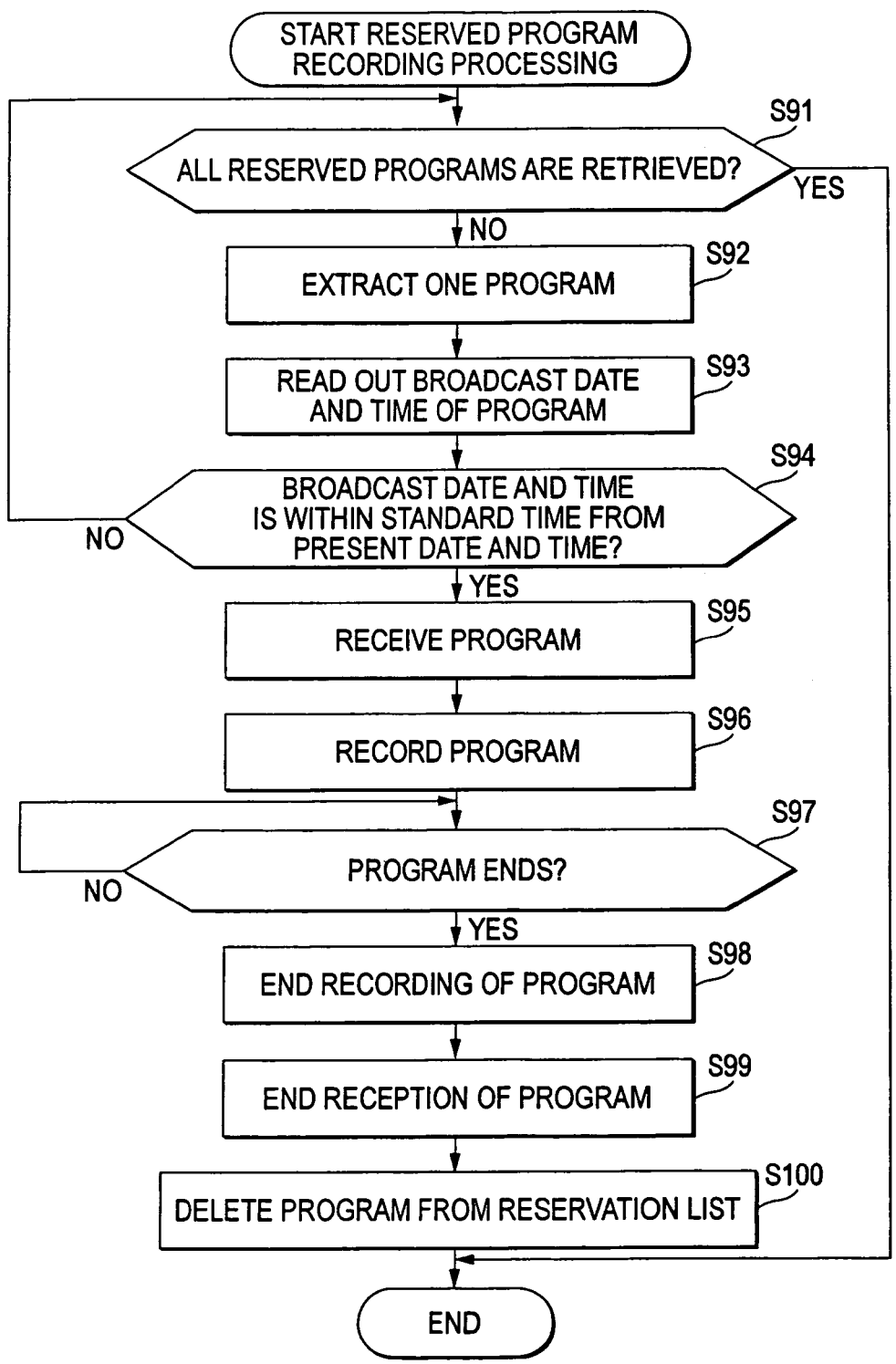
FIG. 13 is a flowchart explaining recording processing for a reserved program of the video recording and reproducing apparatus in FIG. 1.

When the recording reservation list is created as described above, the recording reservation managing unit 67 executes recording processing for reserved programs. Next, this recording processing for reserved programs will be explained with reference to a flowchart in FIG. 13. Note that processing shown in this flowchart in FIG. 13 is performed periodically at a fixed time period.

In step S91, the recording reservation managing unit 67 determines whether all programs reserved in the recording reservation list are retrieved. If a reserved program not retrieved yet is present, then processing proceeds to step S92 and the recording reservation managing unit 67 extracts one program from the recording reservation list. In step S93, the recording reservation managing unit 67 reads out a broadcast date and time of the program extracted by processing in step S92. For example, when a program indicated by a number 1 in FIG. 12 is extracted by the processing in step S92, Jul. 1, 2002 and 16:00:00, which are a broadcast date and a broadcast start time of the program, are read out as a broadcast date and time in processing in step S93.

In step S94, the recording reservation managing unit 67 reads a present date and time from a timer incorporated therein and judges whether the broadcast date and time read out by the processing in step S93 is within a standard time from the present date and time. The standard time is a relatively short time such as, for example, thirty seconds or one minute. This standard time is determined taking into account a time required until recording processing is actually started after control is instructed via the recording control unit 63.

If it is determined that the broadcast date and time is not within the standard time from the present date and time, then processing returns to step S91 and the processing in step S91 and subsequent steps is executed repeatedly.

For example, if the present date and time is 12:00:00 on Jul. 1, 2002, since the present date and time is four hours before the broadcast date and time, then it is determined that the broadcast date and time is not within the standard time. The processing returns to step S91 and the determination processing on whether all the reserved programs are retrieved is performed again. In the present case, since all the programs are not retrieved yet, then processing proceeds to step S92 and the next program is extracted. For example, a program indicated by a number 2 in FIG. 12 is extracted and, in step S93, a broadcast date and time of the number 2 is read out as 17:30:00 on Jul. 1, 2002.

In step S94, it is determined whether the broadcast date and time is within the standard time from the present date and time. If the broadcast date and time is not within the standard time, then processing returns to step S91 and the processing in step S91 and subsequent steps is executed repeatedly.

For example, when the program of the number 1 is selected and a present date and time is 15:59:30 on Jul. 1, 2002, a broadcast date and time 16:00:00 on Jul. 1, 2002 is within thirty seconds from the present date and time 15:59:30 on Jul. 1, 2002 (within a standard time) and, in step S94, it is determined that the broadcast date and time is within the standard time from the present date and time. In this case, processing proceeds to step S95 and the recording reservation managing unit 67 controls the recording control unit 63 to receive a program set as an object presently. In the present case, the recording reservation managing unit 67 controls the recording control unit 63 to receive a broadcast wave of the broadcasting station TV Japan with the tuner 31.

In step S96, the recording reservation managing unit 67 controls the recording control unit 63 to store the program received by processing in step S95 in the auxiliary storage 40.

In other words, a video signal and a sound signal received by the tuner 31 are supplied to the encoder 32 and, after being encoded in the MPEG system, supplied to the auxiliary storage 40 and stored therein.

In step S97, the recording reservation managing unit 67 determines whether the program ends by comparing a broadcast end time of the program for which the recording processing is executed presently and the present time. When the program does not end yet, the recording reservation managing unit 67 is on standby mode until the program ends. When the program ends, the processing proceeds to step S98 and the recording reservation managing unit 67 controls the recording control unit 63 to end the recording processing for the auxiliary storage 40. In addition, in step S99, the recording reservation managing unit 67 controls the recording control unit 63 to end the reception processing of the program by the turner 31.

In step S100, the recording reservation managing unit 67 deletes the program for which recording is completed presently from the recording reservation list.

If it is determined in step S91 that all the reserved programs are retrieved, then processing from step S92 to step S100 is skipped, and processing is ended.

The processing described above is performed at fixed time period, and programs registered in the recording reservation list are sequentially recorded in the auxiliary storage 40 automatically.

It is possible to sort and arrange the recording reservation list shown in FIG. 12 in an order of broadcast date and time. Consequently, a program extracted first by the processing in step S92 is a program having a temporally earliest broadcast date and time and, if it is determined that the broadcast date and time is not within the standard time from the present date and time, broadcast date and times of all the remaining programs are not within the standard time from the present date and time. Thus, it is possible not to perform the determination processing for those programs.

When programs are recorded in the auxiliary storage 40 as described above, the recording title managing unit 65 registers and manages information such as titles and broadcast date and times of the recorded programs.

When the user instructs reproduction of a recorded program via the viewing control application 68, the viewing control application 68 reads out program titles recorded in the auxiliary storage 40 with reference to the management information of the recording title managing unit 65 and causes the display apparatus 12 to display the program titles. When the user looks at this display and selects a program to be an object of reproduction, the viewing control application 68 instructs the recording title reproducing unit 62 to reproduce the program. The recording title reproducing unit 62 reproduces the instructed program from the auxiliary storage 40. Video data and sound data reproduced from the auxiliary storage 40 are input to the decoder 33 and, after being decoded in the MPEG system, output to the display apparatus 12 and displayed thereon.

In the above description, broadcast program information is received from a broadcasting station via a broadcast wave. However, it is also possible to receive the broadcast program information from the server 2-2 via the network 1.

The series of processing described above can be executed by hardware or can be executed by software.

When the series of processing is executed by software, a program comprising the software is installed in a computer, which is incorporated in dedicated hardware, a computer such as a personal computer, which is capable of executing various functions by installing various programs, or the like from a network or a recording medium.

As shown in FIG. 4, the recording medium can be a removable medium 231 comprising a magnetic disk (including a floppy disk), an optical disk (including a CD-ROM (Compact Disk-Read Only Memory) and a DVD (Digital Versatile Disk), a magneto-optical disk (including an MD (Mini-Disk)), a semiconductor memory, or the like having a program recorded therein that is distributed separately from the apparatus main body in order to provide the user with the program, the ROM 222, a hard disk included in the storage unit 228, or the like having the program recorded therein that is provided to the user in a state in which the ROM 222, the hard disk, or the like are incorporated in the apparatus main body in advance.

Note that, in this specification, the step of describing a program to be recorded in a recording medium includes not only processing that is performed in time series in accordance with a described order but also processing that is not always performed in time series but is executed in parallel or individually.

In addition, in this specification, the system represents an entire apparatus comprising a plurality of apparatus.

As described above, according to an embodiment of the invention, it is possible to reserve recording of a program. In particular, according to an embodiment of the invention, reserve recording of a program can be achieved easily and promptly while reducing a burden on a user.

According to another embodiment of the invention, a user of another information processing apparatus can reserve a program. In particular, another user can reserve recording of a program promptly and easily while reducing a burden on the user. In addition, profit can be made by receiving compensation from the user.

The invention claimed is:

1. An information processing method, comprising:
presenting a plurality of program attribute names constituting program attribute information concerning attributes of a program, wherein the program attribute names are other than a title of a program, indicate a program type and are presented for selection without presentation of titles of programs therewith;
accepting a selection of the program attribute information by a user based on the presented program attribute names;
storing the accepted selection of program attribute information;
acquiring program information concerning a program;
automatically acquiring retrieval conditions for retrieving a program based on a determination whether all of the program attribute names for which a flag is set by the selection of the program attribute information by the user based on the presented program attribute names are selected, wherein the retrieval conditions are set other than by the user in association with the program attribute name which corresponds to the stored, accepted selection of program attribute information and include the stored, accepted selection of program attribute information and an escape keyword;
comparing the acquired program information and the acquired retrieval conditions; and
presenting a program that corresponds to the program information acquired, when the program information acquired satisfies the retrieval conditions acquired on the basis of the comparing,
in which the program attribute information includes at least genre information different from the program attribute name or names,
in which the escape keyword is a word which is to be excluded from a title of the program or detailed information introducing contents of the program such that if the escape keyword is included in the title or the detailed information of a respective program then the respective program is to be excluded, and
in which the presenting the plurality of program attribute names, the accepting, the storing, the acquiring program information, the acquiring retrieval conditions, the comparing, and the presenting are performed by an information processing apparatus.

2. A non-transitory computer readable recording medium recorded with a computer readable program for making a computer execute a method of processing information, the method comprising:
presenting a plurality of program attribute names constituting program attribute information concerning attributes of a program, wherein the program attribute names are other than a title of a program, indicate a program type and are presented for selection without presentation of titles of programs therewith;
accepting a selection of the program attribute information by a user based on the presented program attribute names;
storing the accepted selection of program attribute information;
acquiring program information concerning a program;
automatically acquiring retrieval conditions for retrieving a program based on a determination whether all of the program attribute names for which a flag is set by the selection of the program attribute information by the user based on the presented program attribute names are selected, wherein the retrieval conditions are set other than by the user in association with the program attribute name which corresponds to the stored, accepted selection of program attribute information and include the stored, accepted selection of program attribute information and an escape keyword;
comparing the acquired program information and the acquired retrieval conditions; and
presenting a program that corresponds to the program information acquired, when the program information acquired satisfies the retrieval conditions acquired on the basis of the comparing,
in which the program attribute information includes at least genre information different from the program attribute name or names, and
in which the escape keyword is a word which is to be excluded from a title of the program or detailed information introducing contents of the program such that if the escape keyword is included in the title or the detailed information of a respective program then the respective program is to be excluded.

3. A system for processing information, the system comprising:
a processor operable to execute instructions; and
instructions for causing the processor to execute an information processing method, the method comprising:
presenting a plurality of program attribute names constituting program attribute information concerning attributes of a program, wherein the program attribute names are other than a title of a program, indicate a program type and are presented for selection without presentation of titles of programs therewith;

accepting a selection of the program attribute information by a user based on the presented program attribute names;

storing the accepted selection of program attribute information;

acquiring program information concerning a program;

automatically acquiring retrieval conditions for retrieving a program based on a determination whether all of the program attribute names for which a flag is set by the selection of the program attribute information by the user based on the presented program attribute names are selected, wherein the retrieval conditions are set other than by the user in association with the program attribute name which corresponds to the stored, accepted selection of program attribute information and include the stored, accepted selection of program attribute information and an escape keyword;

comparing the acquired program information and the acquired retrieval conditions; and presenting a program that corresponds to the program information acquired, when the program information acquired satisfies the retrieval conditions acquired on the basis of the comparing, in which the program attribute information includes at least genre information different from the program attribute name or names, and in which the escape keyword is a word which is to be excluded from a title of the program or detailed information introducing contents of the program such that if the escape keyword is included in the title or the detailed information of a respective program then the respective program is to be excluded.

4. An information processing method, comprising:

accepting an access request from another information processing apparatus via a network;

receiving from the another information processing apparatus a transfer request for transfer of program attribute information concerning attributes of a program to be reserved for recording, the program attribute information being used when a user of the another information processing apparatus selects the program to be reserved for recording; and transmitting the program attribute information to the another information processing apparatus via the network, the program attribute information including program attribute names for presenting to the user and retrieval conditions for retrieving a program, wherein the program attribute names are other than a title of a program, indicate a program type and are presented for selection without presentation of titles of programs therewith, in which the retrieval conditions are for retrieving a program based on a determination whether all of the program attribute names for which a flag is set by selection of the program attribute information by the user based on the presenting of the program attribute names are selected, in which the retrieval conditions are set other than by the user in association with the program attribute name corresponding thereto and include an escape keyword, and in which the escape word is a word which is to be excluded from a title of the program or detailed information introducing contents of the program such that if the escape keyword is included in the title or the detailed information of a respective program then the respective program is to be excluded, and in which the program attribute information further includes at least genre information different from the program attribute name or names.

5. A non-transitory computer readable recording medium recorded with a computer readable program for making a computer execute a method of processing information, the method comprising:

accepting an access request from another information processing apparatus via a network;

receiving from the another information processing apparatus a transfer request for transfer of program attribute information concerning attributes of a program to be reserved for recording, the program attribute information being used when a user of the another information processing apparatus selects the program to be reserved for recording; and transmitting the program attribute information to the another information processing apparatus via the network, the program attribute information including program attribute names for presenting to the user and retrieval conditions for retrieving a program, wherein the program attribute names are other than a title of a program, indicate a program type and are presented for selection without presentation of titles of programs therewith, in which the retrieval conditions are for retrieving a program based on a determination whether all of the program attribute names for which a flag is set by selection of the program attribute information by the user based on the presenting of the program attribute names are selected, in which the retrieval conditions are set other than by the user in association with the program attribute name corresponding thereto and include an escape keyword, in which the escape keyword is a word which is to be excluded from a title of the program or detailed information introducing contents of the program such that if the escape keyword is included in the title or the detailed information of a respective program then the respective program is to be excluded, and in which the program attribute information further includes at least genre information different from the program attribute name or names.

6. A system for processing information, the system comprising:

a processor operable to execute instructions; and instructions for causing the processor to execute an information processing method, the method including:

accepting an access request from another information processing apparatus via a network;

receiving from the another information processing apparatus a transfer request for transfer of program attribute information concerning attributes of a program to be reserved for recording, the program attribute information being used when a user of the another information processing apparatus selects the program to be reserved for recording; and transmitting the program attribute information to the another information processing apparatus via the network, the program attribute information including program attribute names for presenting to the user and retrieval conditions for retrieving a program, wherein the program attribute names are other than a title of a program, indicate a program type and are presented for selection without presentation of titles of programs therewith, in which the retrieval conditions are for retrieving a program based on a determination whether all of the program attribute names for which a flag is set by selection of the program attribute information by the user based on the presenting of the program attribute names are selected, in which the retrieval conditions are set other than by the user in association with the program attribute name corresponding thereto and include an escape keyword, in which the escape word is a word which is to be excluded from a title of the program or detailed information introducing contents of the program such that if the escape keyword is included in the title or the detailed information of a respective program then the respective program is to be excluded, and in which the program attribute information further includes at least genre information different from the program attribute name or names.

7. An information processing apparatus, comprising:
a processor,
said processor configured: to present a plurality of program attribute names constituting program attribute information concerning attributes of a program, wherein the program attribute names are other than a title of a program, indicate a program type and are presented for selection without presentation of titles of programs therewith;

to accept a selection of the program attribute information by a user based on the presented program attribute names;

to store the accepted selection of program attribute information;

to acquire program information concerning a program;

to automatically acquire retrieval conditions for retrieving a program based on a determination whether all of the program attribute names for which a flag is set by the selection of the program attribute information by the user based on the presented program attribute names are selected, wherein the retrieval conditions are set other than by the user in association with the program attribute name which corresponds to the stored, accepted selection of program attribute information and include the stored, accepted selection of program attribute information and an escape keyword;

to compare the acquired program information and the acquired retrieval conditions; and to, when the program information acquired satisfies the retrieval conditions acquired on the basis of a comparison result, present a program that corresponds to the program information acquired, in which the program attribute information includes at least genre information different from the program attribute name or names, and in which the escape keyword is a word which is to be excluded from a title of the program or detailed information introducing contents of the program such that if the escape keyword is included in the title or the detailed information of a respective program then the respective program is to be excluded.

8. An information processing apparatus, comprising:
a processor,
said processor configured: to accept an access request from another information processing apparatus via a network;

to receive from the another information processing apparatus a transfer request for transfer of program attribute information concerning attributes of a program to be reserved for recording, the program attribute information being used when a user of the another information processing apparatus selects the program to be reserved for recording; and to transmit the program attribute information to the another information processing apparatus via the network, the program attribute information including program attribute names for presenting to the user and retrieval conditions for retrieving a program, wherein the program attribute names are other than a title of a program, indicate a program type and are presented for selection without presentation of titles of programs therewith, in which the retrieval conditions are for retrieving a program based on a determination whether all of the program attribute names for which a flag is set by selection of the program attribute information by the user based on the presenting of the program attribute names are selected, in which the retrieval conditions are set other than by the user in association with the program attribute name corresponding thereto and include an escape keyword, in which the escape word is a word which is to be excluded from a title of the program or detailed information introducing contents of the program such that if the escape keyword is included in the title or the detailed information of a respective program then the respective program is to be excluded, and in which the program attribute information further includes at least genre information different from the program attribute name or names.

9. An information processing apparatus, comprising:
a processor configured:
to present a plurality of program attribute names constituting program attribute information concerning attributes of a program, wherein the program attribute names are other than a title of a program, indicate a program type and are presented for selection without presentation of titles of programs therewith;

to accept a selection of the program attribute information by a user based on the presented program attribute names;

to store the accepted selection of program attribute information;

to acquire program information concerning a program;

to automatically acquire retrieval conditions for retrieving a program based on a determination whether all of the program attribute names for which a flag is set by the selection of the program attribute information by the user based on the presented program attribute names are selected, wherein the retrieval conditions are set other than by the user in association with the program attribute name which corresponds to the stored, accepted selection of program attribute information and include the stored, accepted selection of program attribute information and an escape keyword; to compare the acquired program information and the retrieval conditions to obtain a comparison result; and when the acquired program information satisfies the retrieval conditions on the basis of the comparison result, presents a program that corresponds to the acquired program information, in which the program attribute information includes at least genre information different from the program attribute name or names, and in which the escape keyword is a word which is to be excluded from a title of the program or detailed information introducing contents of the program such that if the escape keyword is included in the title or the detailed information of a respective program then the respective program is to be excluded.

10. An information processing apparatus according to claim 9, wherein the program attribute names include at least one of foreign film, soap opera, rebroadcast drama, baseball, soccer, midnight vaudeville, melodramatic Japanese popular song, classical music, news, cooking, hot spring, or go/shogi.

11. An information processing apparatus according to claim 9, wherein the retrieval conditions include at least one of a genre of a program, a day of week on which the program is broadcast, a time frame in which the program is broadcast, a length of the program, or a keyword included in a title of the program or in detailed information introducing contents of the program.

12. An information processing apparatus according to claim 9, further comprising a receiving unit to receive the program attribute information including the program attribute names and the retrieval conditions from another information processing apparatus via a network, wherein
the processor presents the program attribute names included in the program attribute information received by the receiving unit.

13. An information processing apparatus, comprising:
a processor to accept an access request from another information processing apparatus via a network;
a receiving unit to receive from the another information processing apparatus a transfer request for transfer of program attribute information concerning attributes of a program to be reserved for recording, the program attribute information being used when a user of the another information processing apparatus selects the program to be reserved for recording; and
a transmitting unit to transmit the program attribute information to the another information processing apparatus via the network, the program attribute information including program attribute names for presenting to a user and retrieval conditions for retrieving a program, wherein the program attribute names are other than a title of a program, indicate a program type and are presented for selection without presentation of titles of programs therewith,
in which the retrieval conditions are for retrieving a program based on a determination whether all of the program attribute names for which a flag is set by selection of the program attribute information by the user based on the presenting of the program attribute names are selected,
in which the retrieval conditions are set other than by the user in association with the program attribute name corresponding thereto and include an escape keyword,
in which the escape word is a word which is to be excluded from a title of the program or detailed information introducing contents of the program such that if the escape keyword is included in the title or the detailed information of a respective program then the respective program is to be excluded, and
in which the program attribute information further includes at least genre information different from the program attribute name or names.

14. An information processing apparatus according to claim 13, wherein the program attribute names include at least one of a foreign film, soap opera, rebroadcast drama, baseball, soccer, midnight vaudeville, melodramatic Japanese popular song, classical music, news, cooking, hot spring, or go/shogi.

15. An information processing apparatus according to claim 13, wherein the retrieval conditions further include at least one of a genre of a program, a day of week on which the program is broadcast, a time frame in which the program is broadcast, a length of the program, or a keyword included in a title of the program or in detailed information introducing contents of the program.

16. An information processing apparatus according to claim 9, further comprising a recording unit that records the program presented by the reserving unit.

* * * * *